(12) United States Patent
Bouckaert et al.

(10) Patent No.: US 9,161,229 B2
(45) Date of Patent: Oct. 13, 2015

(54) RELATING TO COMMUNICATIONS

(75) Inventors: Philippe Bouckaert, Sophia-Antipolis (FR); Nadia Azouz, Sophia-Antipolis (FR); Guy Macheboeuf, Sophia-Antipolis (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 772 days.

(21) Appl. No.: 12/997,818
(22) PCT Filed: Jun. 12, 2009
(86) PCT No.: PCT/EP2009/004227
§ 371 (c)(1),
(2), (4) Date: Dec. 13, 2010
(87) PCT Pub. No.: WO2009/149943
PCT Pub. Date: Dec. 17, 2009

(65) Prior Publication Data
US 2011/0087782 A1   Apr. 14, 2011

(30) Foreign Application Priority Data
Jun. 13, 2008   (EP) .................................... 08300222

(51) Int. Cl.
*G06F 15/173* (2006.01)
*H04W 12/12* (2009.01)
(Continued)

(52) U.S. Cl.
CPC ............ *H04W 12/12* (2013.01); *H04L 63/101* (2013.01); *H04W 8/22* (2013.01); *H04W 8/26* (2013.01); *H04W 12/08* (2013.01)

(58) Field of Classification Search
CPC ....... H04W 12/12; H04W 12/08; H04W 8/22; H04W 8/26; H04L 63/101
USPC ............... 455/410, 411, 435.1; 707/781–788; 709/223–229; 726/2–4
See application file for complete search history.

(56) References Cited

U.S. PATENT DOCUMENTS 5,625,671 A * 4/1997 Salin .............................. 455/411
5,784,562 A * 7/1998 Diener .......................... 709/217
(Continued)

FOREIGN PATENT DOCUMENTS

EP   0973344 A2 *  1/2000
EP   1865744 A1   12/2007
(Continued)

OTHER PUBLICATIONS

Rummler R et al: "End-to-end ip multicast for software upgrades of reconfigurable user terminals within IMT-2000/UMTS networks" Proceedings of IEEE International Conference on Communications—Apr. 28-May 2, 2002—New York , NY , USA , IEEE , Piscataway , NJ , USA , vol. 1 , Apr. 28, 2002, pp. 502-506.
(Continued)

*Primary Examiner* — Andrew Nalven
*Assistant Examiner* — Walter Malinowski
(74) *Attorney, Agent, or Firm* — Hewlett-Packard Patent Department

(57) ABSTRACT

According to one embodiment of present invention, there is provided a method of controlling access to a communication network. The method includes receiving a request from a communication device to connect to the communication network, the request including a substantially unique identifier of the device, and determining whether the identifier is contained in a local device database of the network. Where it is determined that the identifier is not contained in the local database, the method further includes authorizing the device to connect to the network, and at a subsequent update of the local device database, determining the status of the identifier from a shared device database, and updating the status of the determined identifier in the local device database with the determined status.

17 Claims, 2 Drawing Sheets

(51) Int. Cl.
*H04L 29/06* (2006.01)
*H04W 8/22* (2009.01)
*H04W 8/26* (2009.01)
*H04W 12/08* (2009.01)

(56) References Cited

U.S. PATENT DOCUMENTS

| | | | | |
|---|---|---|---|---|
| 5,809,413 | A * | 9/1998 | Meche et al. | 455/411 |
| 6,081,731 | A * | 6/2000 | Boltz et al. | 455/565 |
| 6,091,946 | A | 7/2000 | Ahvenainen | |
| 6,321,267 | B1 * | 11/2001 | Donaldson | 709/229 |
| 6,571,254 | B1 * | 5/2003 | Kido et al. | 707/781 |
| 7,047,258 | B2 * | 5/2006 | Balogh et al. | 707/610 |
| 7,062,570 | B2 * | 6/2006 | Hong et al. | 709/238 |
| 7,234,157 | B2 * | 6/2007 | Childs et al. | 726/2 |
| 7,254,223 | B1 * | 8/2007 | Henderson | 379/142.04 |
| 7,308,088 | B1 * | 12/2007 | Henderson | 379/142.04 |
| 7,383,044 | B2 * | 6/2008 | Bleckert et al. | 455/433 |
| 7,546,353 | B2 * | 6/2009 | Hesselink et al. | 709/228 |
| 7,593,930 | B2 * | 9/2009 | Braun et al. | 709/224 |
| 7,698,744 | B2 * | 4/2010 | Fanton et al. | 726/27 |
| 7,793,105 | B2 * | 9/2010 | Korkishko et al. | 713/175 |
| 7,890,463 | B2 * | 2/2011 | Romem et al. | 707/636 |
| 7,903,799 | B1 * | 3/2011 | Ganesan et al. | 455/414.1 |
| 7,941,510 | B1 * | 5/2011 | Tormasov et al. | 709/220 |
| 8,250,633 | B2 * | 8/2012 | Vedula et al. | 726/5 |
| 2001/0053684 | A1 * | 12/2001 | Pirila | 455/410 |
| 2002/0120873 | A1 | 8/2002 | Salmivalli | |
| 2002/0169777 | A1 * | 11/2002 | Balajel et al. | 707/10 |
| 2003/0027581 | A1 * | 2/2003 | Jokinen et al. | 455/456 |
| 2003/0069938 | A1 * | 4/2003 | Russell | 709/213 |
| 2003/0140038 | A1 * | 7/2003 | Baker et al. | 707/3 |
| 2004/0198311 | A1 * | 10/2004 | Aerrabotu et al. | 455/404.1 |
| 2004/0203648 | A1 * | 10/2004 | Wong | 455/414.1 |
| 2005/0044244 | A1 * | 2/2005 | Warwick et al. | 709/229 |
| 2005/0188092 | A1 * | 8/2005 | Short et al. | 709/227 |
| 2005/0280557 | A1 * | 12/2005 | Jha et al. | 340/988 |
| 2006/0117104 | A1 * | 6/2006 | Taniguchi et al. | 709/225 |
| 2006/0212479 | A1 * | 9/2006 | Habas et al. | 707/104.1 |
| 2006/0288420 | A1 * | 12/2006 | Mantripragada et al. | 726/25 |
| 2007/0077912 | A1 * | 4/2007 | Mahajan | 455/410 |
| 2007/0187491 | A1 * | 8/2007 | Godwin et al. | 705/35 |
| 2007/0189500 | A1 * | 8/2007 | Stanford | 379/355.01 |
| 2007/0207775 | A1 * | 9/2007 | Denenberg et al. | 455/406 |
| 2007/0275718 | A1 * | 11/2007 | Descombes et al. | 455/435.1 |
| 2007/0287433 | A1 * | 12/2007 | Wollersheim et al. | 455/414.1 |
| 2007/0294747 | A1 * | 12/2007 | Rosenberger | 726/4 |
| 2008/0077995 | A1 * | 3/2008 | Curnyn | 726/27 |
| 2008/0094219 | A1 * | 4/2008 | Guenster et al. | 340/572.3 |
| 2008/0101572 | A1 * | 5/2008 | Chen et al. | 379/201.01 |
| 2008/0133547 | A1 * | 6/2008 | Reasor et al. | 707/10 |
| 2008/0207181 | A1 * | 8/2008 | Jiang | 455/414.1 |
| 2009/0049031 | A1 * | 2/2009 | Hepburn | 707/5 |
| 2009/0061863 | A1 * | 3/2009 | Huggett et al. | 455/434 |
| 2009/0150553 | A1 * | 6/2009 | Collart et al. | 709/229 |
| 2009/0157537 | A1 * | 6/2009 | Miller | 709/203 |
| 2009/0175561 | A1 * | 7/2009 | Lankswert | 382/305 |
| 2009/0222509 | A1 * | 9/2009 | King et al. | 709/203 |
| 2009/0227226 | A1 * | 9/2009 | Gupta et al. | 455/405 |
| 2010/0075666 | A1 * | 3/2010 | Garner | 455/426.1 |
| 2010/0178864 | A1 * | 7/2010 | Chow et al. | 455/3.06 |
| 2010/0210259 | A1 * | 8/2010 | Morales Barbosa | 455/422.1 |
| 2011/0087782 | A1 | 4/2011 | Bouckaert et al. | |
| 2011/0282994 | A1 * | 11/2011 | Sitaraman et al. | 709/225 |

FOREIGN PATENT DOCUMENTS

EP    1865744 A1    12/2007
JP    2000322474 A * 11/2000

OTHER PUBLICATIONS

"Digital cellular telecommunications system (Phase 2+); Universal Mobile Telecommunications System (UMTS); International Mobile Equipment Identities (IMEI) (3GPP TS 22.016 version 7.0.1 Release 7); ETSI TS 122 016" ETSI Standards, LIS, Sophia Antipol is Cedex, France, vol. 3-SAI, No. V7.0., May 1, 2007.

State Intellectual Property Office of People's Republic of China. Search Report. Application No. 200980122334.3 Filing date Jun. 12, 2009.

* cited by examiner

RELATING TO COMMUNICATIONS

RELATED APPLICATIONS

The present application claims the priority under 35 U.S.C. 119(a)-(d) or (f) and under C.F.R. 1.55(a) of previous International Patent Application No.: PCT/EP2009/004227, filed Jun. 12, 2009, entitled "Controlling Access to a Communication Network Using a Local Device Database and a Shared Device Database", which claims the priority under 35 U.S.C. 119(a)-(d) or (f) and under C.F.R. 1.55(a) of previous European Patent Application No.: 08300222.0, filed Jun. 13, 2008, entitled "Controlling Access to a Communication Network Using a Local Device Database and a Shared Device Database", which applications are incorporated herein by reference in its entirety.

BACKGROUND OF THE INVENTION

Mobile telephones and other such mobile communication devices are typically assigned a unique identity at manufacture. For example, all communication devices capable of communicating with a GSM or 3G network have a unique international mobile equipment identity (IMEI) number. For GSM and 3G devices the GSM association allocates IMEI numbers to device manufacturers. The IMEI information is maintained in a global IMEI database (IMEI DB), formerly known as the central EIR (CEIR), and is made available to all GSM and 3G network operators.

Additionally, each network operator maintains their own equipment identity register (EIR). An EIR enables a network operator to maintain a so-called blacklist of GSM or 3G devices that should be denied service on mobile networks because they have been reported as lost, stolen, faulty, or otherwise unsuitable for use.

The IMEI DB also maintains a blacklist that is updated regularly from the EIRs of participating GSM and 3G network operators. This in turn enables each network operator to update their own EIRs with the global blacklist of devices. In this way, each EIR is able to deny service to any device on the global blacklist.

However, as the number of network operators who provide their EIR blacklist to the IMEI DB, so the size of the IMEI DB blacklist grows. Consequently, when a network operator wishes to download the global IMEI DB blacklist, huge amounts of data are involved.

Accordingly, one aim of the present invention is to overcome, or at least alleviate, at least some of the problems of the prior art.

According to a first aspect of the present invention there is provided a method of controlling access to a communication network, comprising receiving a request from a communication device to connect to the communication network, the request including a substantially unique identifier of the device, and determining whether the identifier is contained in a local device database of the network. Where it is determined that the identifier is not contained in the local database the method further comprises authorizing the device to connect to the network, and at a subsequent update of the local device database, determining the status of the identifier from a shared device database, and updating the status of the determined identifier in the local device database with the determined status.

Suitably, the local database comprises identifiers of devices authorized to connect to the network and identifiers of devices not authorized to connect to the network, the step of authorizing comprising determining whether the received identifier is authorized to connect to the network.

Suitably, the method further comprises, where an identifier is not contained in the local database, marking the identifier such that the status thereof is subsequently retrieved from the shared device database.

Suitably, the local database comprises a white-list of device identifiers authorized to connect to the network, a black list of device identifiers not authorized to connect to the network, and a gray-list of device identifiers authorized to connect to the network but to be monitored, the step of authorizing comprising determining whether the device is authorized to connect to the network by way of the identifier.

Suitably, where the identifier is not contained in the local database, the method further comprises adding the identifier to the gray-list of the local database.

Suitably, during the update of the local device database, the method further comprises updating the status of any gray-listed devices with the status stored in the shared device database.

Suitably, the method is adapted for use for with a mobile telecommunication network.

Suitably, the method is adapted for use with a GSM or 3G telecommunications network, the device identifiers being international mobile equipment identity numbers, the local database being an equipment identity register and the shared database being a global IMEI database.

According to a second aspect of the present invention, there is provided a communication system operable in accordance with any of above-mentioned method steps.

BRIEF DESCRIPTION OF THE DRAWINGS

Embodiments of the present invention will now be described, by way of non-limiting example only, with reference to the accompanying diagrams, in which.

DETAILED DESCRIPTION

Figure 1:
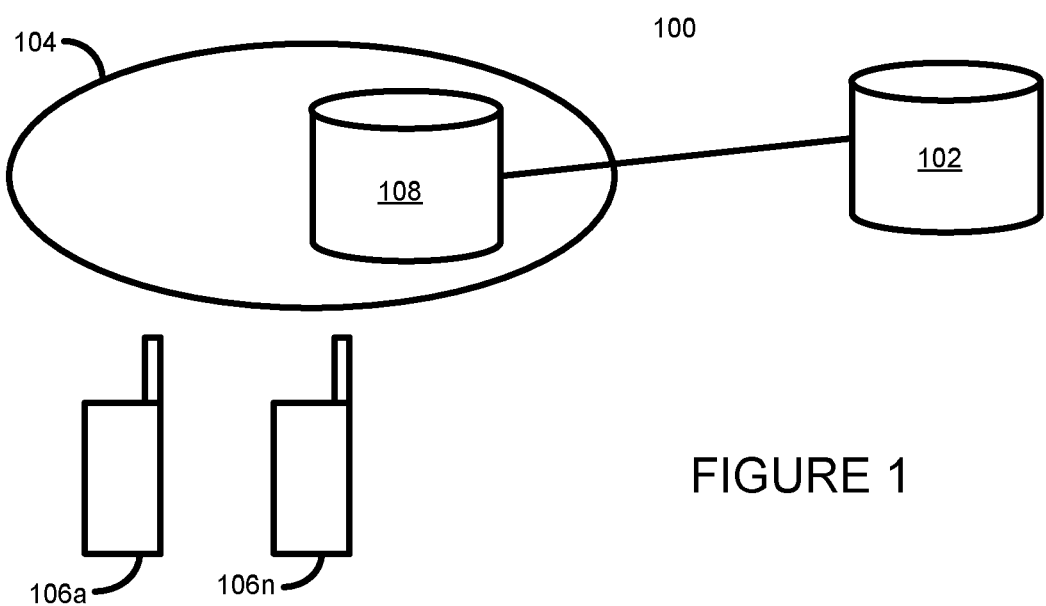
FIG. 1 is a simplified block diagram of a system according to the prior art.

Referring now to FIG. 1, there is a shown a mobile communication system 100 according to the prior art. The system 100 could, for example, be a GSM or a 3G (third generation) mobile communication network.

The system 100 comprises a mobile communication network 104 through which mobile communication devices 106a to 106n can make and receive telephone calls and access other services, such as data services. The communication network 104 includes a local equipment identity register (EIR) 108. The network 104 also has access to a remote central equipment identity register (CEIR) 102. Those skilled in the art will appreciate that for reasons of clarity, not all elements of a mobile communication network are shown.

The EIR 108 is part of the network 104 and contains IMEI numbers of white-listed, black-listed, and gray-listed devices. The EIR white-list comprises IMEI numbers of devices authorized for use on the network 104, the blacklist comprises IMEI numbers of devices to be denied access to the network 104, and the gray-list comprises IMEI numbers of devices to be monitored for various reasons.

The CEIR 102 is accessible, for example via the Internet, from other mobile communication networks (not shown) and serves as a shared central device database to which local EIRs, such as EIR 108, may periodically upload their own blacklists, and also from which EIRs may periodically download a consolidated blacklist comprising the blacklists of all of other mobile networks who use the CEIR 102. In this way, the blacklists of the local EIRs and the CEIR 102 are substantially synchronized.

When a mobile communication device 106a connects to the network 104, for example, when the device is switched on, messages are sent from the device 106a to the network 104. One of the messages sent to the network 104 includes the unique international mobile equipment identity (IMEI) number of the device 106a. To determine whether to authorize the device 106a to connect to the network 104, the received IMEI number of the device 106a is checked in the local electronic identity register (EIR) 108, for example by way of a mobile application part (MAP) MAP-CHECK-IMEI message. If the IMEI number is found in the white-list or in the gray-list, the device 106a is authorized to connect to the network 104, and the device 106a is connected to the network. However, if the IMEI number is found in the blacklist, the device is prevented from accessing the network 104.

Those skilled in the art will appreciate that the IMEI of a mobile communication device may be checked at other times, for example, as part of a periodic check, when a device comes back into range of a communication network, or at any other appropriate time.

In this way, access to the communication network can be controlled so that a communication device denied service on one mobile communication networks will be denied service on other mobile communication networks having their local EIRs synchronized with the CEIR.

One problem, however, with this approach is that the size of the CEIR is substantial, and grows as more and more network operators synchronize their local EIRs with the CEIR. Downloading the consolidated central blacklist consumes large amounts of bandwidth, and required significant processing resources to integrate into the local EIRs.

One way to reduce the amount of data required for the synchronization of the local EIR blacklist is to only download country or regional level blacklist IMEIs. For example, a network operator in France may consider just downloading the list of blacklisted IMEIs originating in Europe. However, given increasing global trafficking in stolen communication devices, such an approach would not, for example, prevent a communication device stolen in one region from being used in a different geographic region.

Figure 2:
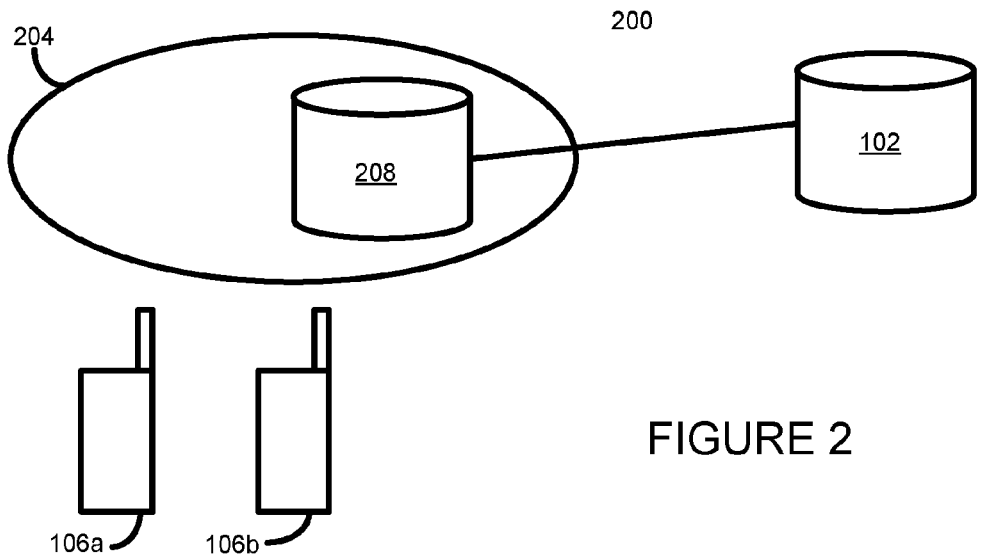
FIG. 2 is a simplified block diagram of a communication system according to an embodiment of the present invention.

Referring now to FIG. 2, there is shown a simplified block diagram of a communication system according to an embodiment of the present invention.

In the system 200, the EIR 208 is not synchronized with the CEIR 102, and the EIR 208 initially maintains only IMEI numbers of devices authorized by the provider of the communication network 204.

Figure 3:
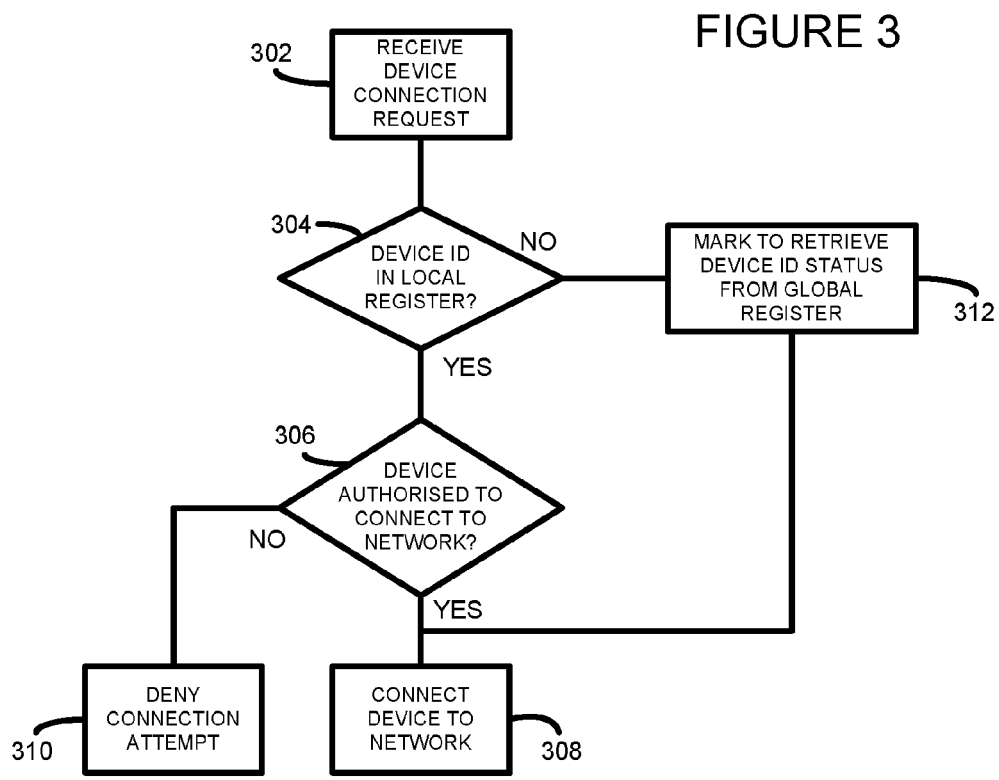
FIG. 3 is a flow diagram outlining example processing steps taken by the communication network of FIG. 2 according to one embodiment of the present invention.

The operation of the system 200 will now be described in greater detail with reference to FIG. 3, which is a flow diagram outlining processing steps taken according to one embodiment of the present invention.

At step 302 the communication network 204 receives a request from a device 106a to connect to the network 204. The request includes the IMEI number of the device 106a. At step 304, the network 204 determines whether the received IMEI number is held in the local EIR 208. If yes, at step 306 it is determined whether the device 106a is authorized to connect to the network 104. For example, if the IMEI of device 106a is held in either the white-list or gray-list of the EIR the device 106a is authorized to connect (step 308) to the communication network 204. If, however, the IMEI of device 106a is held in the blacklist of the EIR, the device 106a is denied access (step 310) to the communication network 204.

If, however, the IMEI of the device 106a is not held in the EIR 208 (step 304) the IMEI of the device 106a is marked (step 312) to be retrieved from the CEIR 102 during a subsequent update procedure. The device 106a is then authorized to connect (step 308) to the communication network 308. The way in which the IMEI of a device may be marked to be retrieved from the CEIR may be achieved, for example, by adding the IMEI of the device to a graylist of the EIR 208.

Periodically, for example daily, the latest status (such as white-list, blacklist) of any 'gray-listed' IMEIs in the EIR 208 are retrieved from the CEIR 102 and are updated, as appropriate, in the EIR 208. At the same time, the EIR 208 may also transmit its own blacklist to the CEIR 102.

In this way, after the periodic update, the current status of the device 106a is held in the EIR 208, and a future connection attempt will be based on the updated status. If, after the periodic update, the IMEI of the device 106a is blacklisted, any future connection attempts by a device having that IMEI will be denied.

Advantageously, the present embodiments only require a download from the CEIR 102 of any gray-listed devices in the EIR 208. This significantly reduces the amount of data needing to be transferred, as well as reducing the performance and storage requirements of the EIR 208. A device having a blacklisted IMEI number which is not initially in the local EIR of a network to which the blacklisted device attempts to connect will be denied access to the network after the next periodic update of the local EIR. If the periodic update is performed regularly, for example, daily this ensures the effectiveness of the blocking mechanisms provided for the EIR and CEIR.

Those skilled in the art, however, will appreciate that embodiments of the present invention could be adapted for use in other networks access to which is made through access devices having substantially unique identifiers maintained in local and global access control databases. For example, such embodiments could be used with WIFI networks, fixed line broadband networks, Bluetooth networks, and the like.

The invention claimed is:
1. A method of controlling access to a communication network, comprising:
receiving a request from a communication device to connect to the communication network, the request including a substantially unique identifier of the communication device;
determining whether the identifier is contained in a local device database of the network; and
where the identifier is not contained in the local device database: authorizing the communication device to connect to the network;
at a subsequent update of the local device database, determining a status of the identifier from a shared device database; and
updating the status of the identifier in the local device database, wherein the local device database comprises:
a white-list of device identifiers authorized to connect to the network;
a black list of device identifiers not authorized to connect to the network; and a gray-list of device identifiers authorized to connect to the network but to be monitored;
in which authorizing the communication device to connect to the network comprises determining whether the com- munication device is authorized to connect to the network by way of the identifier.

2. The method of claim 1, wherein the local device database comprises:
   identifiers of devices authorized to connect to the network; and
   identifiers of devices not authorized to connect to the network;
   in which authorizing the communication device to connect to the network comprises determining whether a received identifier is an identifier which is authorized to connect to the network.

3. The method of claim 1, further comprising where an identifier is not contained in the local device database, marking the identifier such that the status thereof is subsequently retrieved from the shared device database.

4. The method of claim 1, further comprising where the identifier is not contained in the local device database, adding the identifier to the gray-list of the local device database.

5. The method of claim 1, further comprising during updating of the local device database, updating the status of any gray-listed devices with a status stored in the shared device database.

6. The method of claim 5, in which authorizing the communication device to connect to the network comprises denying the communication device connection to the communication network if the identifier of the communication device is classified as a gray-list identifier, and if updating the status of any gray-listed devices with a status stored in the shared device database results in the updating of the communication device as a black-listed communication device.

7. The method of claim 1, in which the method is performed with a mobile telecommunication network.

8. The method of claim 1, in which the device identifiers are international mobile equipment identity numbers, the local device database are an equipment identity register and the shared database is a global IMEI database.

9. A communication system, comprising:
   a processor; and
   a data storage device communicatively coupled to the processor, the data storage device comprising computer executable code that, when executed by the at least one processor, causes the at least one processor to:
   receive a request from a communication device to connect to the communication network, the request including a substantially unique identifier of the communication device;
   determine whether the identifier is contained in a local device database of the network; and
   where the identifier is not contained in the local device database:
   authorize the communication device to connect to the network;
   at a subsequent update of the local device database, determine a status of the identifier from a shared device database; and
   update the status of the identifier in the local device database, wherein the local device database comprises:
   a white-list of device identifiers authorized to connect to the network;
   a black list of device identifiers not authorized to connect to the network; and
   a gray-list of device identifiers authorized to connect to the network but to be monitored;
   in which authorizing the communication device to connect to the network comprises determining whether the communication device is authorized to connect to the network by way of the identifier.

10. The communication system of claim 9, further comprising computer executable code that, when executed by the at least one processor, causes the at least one processor to, where an identifier is not contained in the local device database, marking the identifier such that the status thereof is subsequently retrieved from the shared device database.

11. The communication system of claim 9, further comprising where the identifier is not contained in the local device database, adding the identifier to the gray-list of the local device database.

12. The communication system of claim 9, further comprising during updating of the local device database, updating the status of any gray-listed devices with a status stored in the shared device database.

13. A communication system comprising: an equipment identity register (EIR); and
   a data storage device communicatively coupled to the EIR comprising:
   a database of a number of equipment identity register (EIR) entries, the EIR entries comprising a number of international mobile equipment identities (IMEIs), in which, if an IMEI is not contained in the database upon receipt of a request from a communication device to connect to a communication network, the communication system:
   authorizes the communication device to connect to the network;
   at a subsequent update of the EIR, determines a status of the IMEI from the database; and
   updates the status of the identifier in the EIR and handles future connection of the communication device to the network according to the updated status of the identifier, wherein the database comprises:
   a white-list of IMEIs authorized to connect to the network;
   a black list of IMEIs not authorized to connect to the network; and
   a gray-list of IMEIs authorized to connect to the network but to be monitored;
   in which authorizing the communication device to connect to the network comprises determining whether the communication device is authorized to connect to the network by way of the IMEI.

14. The communication system of claim 13, in which where an IMEI is not contained in the local device database comprises marking the identifier such that the status thereof is subsequently retrieved from a shared device database.

15. The communication system of claim 13, further comprising where the IMEI is not contained in the database, adding the identifier to the gray-list of the database.

16. The communication system of claim 13, further comprising during updating of the database, updating the status of any gray-listed devices with a status stored in a shared device database.

17. The communication system of claim 16, in which authorizing the communication device to connect to the network comprises denying the communication device connection to the communication network if the identifier of the communication device is classified as a gray-list identifier, and if updating the status of any gray-listed devices with a status stored in the shared device database results in the updating of the communication device as a black-listed communication device.

* * * * *